No. 721,384. PATENTED FEB. 24, 1903.
M. T. PHILLIPS.
SUCKLING FEEDER.
APPLICATION FILED DEC. 9, 1902.
NO MODEL.
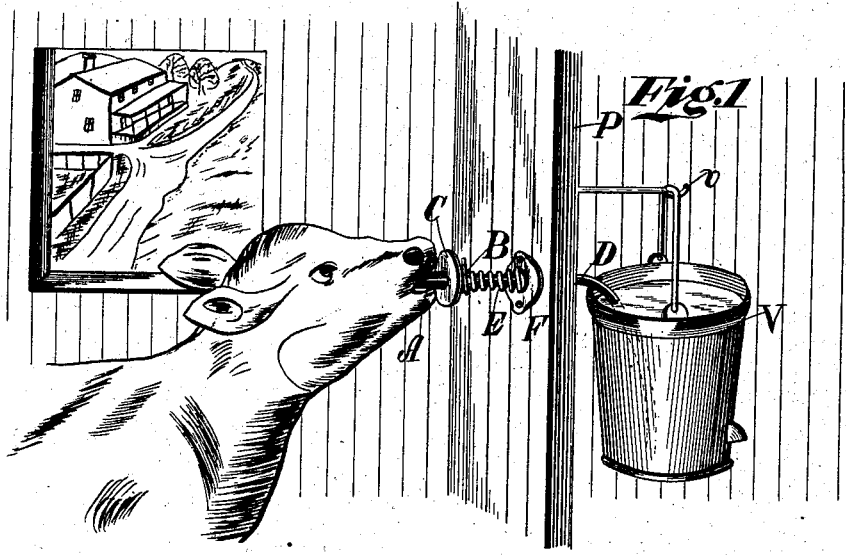
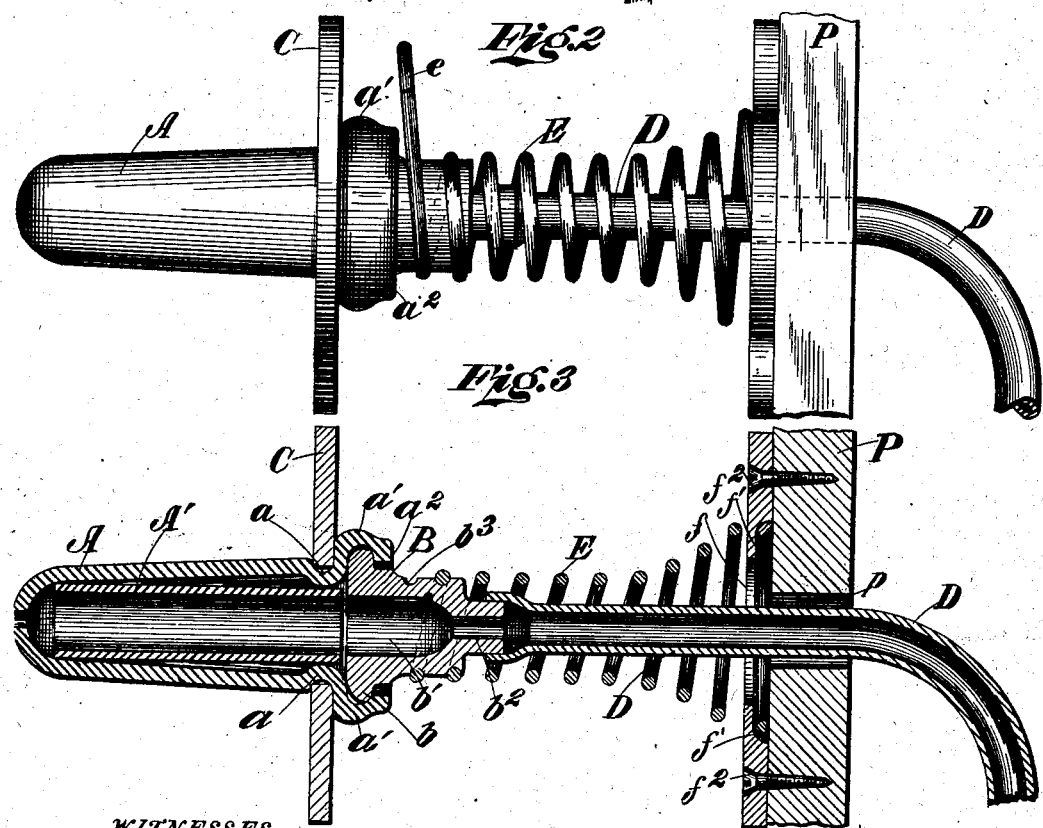
WITNESSES
C. Edw. Duffey.
James P. Mansfield.
INVENTOR
Maurice T. Phillips.
By: Alexander & Dowell
Attorneys.

UNITED STATES PATENT OFFICE.

MAURICE T. PHILLIPS, OF POMEROY, PENNSYLVANIA.

SUCKLING-FEEDER.

SPECIFICATION forming part of Letters Patent No. 721,384, dated February 24, 1903.

Application filed December 9, 1902. Serial No. 134,467. (No model.)

*To all whom it may concern:*

Be it known that I, MAURICE T. PHILLIPS, of Pomeroy, in the county of Chester and State of Pennsylvania, have invented certain new and useful Improvements in Suckling-Feeders; and I hereby declare that the following is a full, clear, and exact description thereof, reference being had to the accompanying drawings, which form part of this specification.

This invention is an improved sucklingfeeder for calves, colts, and other young animals whom it is necessary or desired to separate from their dams; and the objects of the present invention are to provide a feeder which can be easily cleansed, the fluid-conducting parts being readily detachable; to provide a novel reinforced nipple which cannot collapse; to provide a spring-support and guard for the nipple which will allow it to yield like an udder-teat if the calf "bunts" it without injury to the animal's mouth and prevents the nipple being torn if the calf pulls upon it too hard, also to construct the feeder so that the nipple-support can be readily attached to one side of a board or other partition, while the vessel containing the liquid food can be suspended on the other side of the partition out of reach of the animal.

Other novel features of construction and advantages of the improved feeder will be understood from the following detailed description thereof in connection with the drawings, which illustrate the same, and in which—

Figure 1 is a view illustrating the sucklingfeeder in use. Fig. 2 is an enlarged side view thereof, and Fig. 3 a longitudinal section through Fig. 2.

The complete feeder comprises a nipple A, head B, guard C, supply-tube D, spring E, and fastening-plate F. The nipple A is provided with a contracted portion or neck $a$, connecting it with an annular enlargement $a'$, terminating in a contracted ring $a^2$, the nipple being secured to a head-casting B by springing the ring $a^2$ over a flange $b$ on the end of the head, said flange fitting in the enlargement $a'$ of the nipple and securely holding the nipple thereto. To prevent the calf taking the nipple too far into its mouth, a guard C (preferably a disk of leather) is slipped on the nipple, said guard having a central aperture fitting the contracted neck $a$ of the nipple, as shown in the drawings. The part $b$ of the head B fitting in enlargement $a'$ affords a backing to the guard and prevents the animal forcing it off the nipple. Within the nipple is placed a short tube A', which extends from the neck $a$ to the front end of nipple and forms a reinforce for the nipple, preventing collapse thereof. Preferably this reinforce is formed of a section of rubber tubing stiffer than the nipple proper. The reinforce is kept in position in the nipple by the contracted neck $a$ and also by the head B when the nipple is attached thereto.

The head B is provided with a central aperture $b'$ and a contracted rear end $b^2$, to which the end of a flexible rubber supplytube D is connected by slipping it over end $b^2$, as indicated in the drawings. The opening in the head is slightly smaller in diameter than the reinforce A', so that the latter will be kept in the nipple when the nipple is attached to the head. The head is also preferably formed with a spiral worm or groove $b^3$, which receives the end of the helical spring E and affords a simple means of firmly and securely fastening the head to the spring. The other end of the spring E is preferably slightly enlarged and is fastened to the wall or partition P by means of a plate-casting F, provided with a central opening $f$ and a surrounding annular recess $f'$ to accommodate the end convolutions of the spring and with perforations for the passage of the retainingscrews $f^2$, as shown. The forward end of the spring E is preferably provided with a tangential extension $e$, affording a convenient means of holding the spring while placing or replacing the head and connected parts thereon. An opening $p$ is made in the partition opposite the opening in plate F to allow the supply-tube D to be passed through the spring, plate, and partition, as shown, to the opposite side of the partition, where it enters the vessel V, containing milk or other liquid food for the animal. The vessel may be conveniently hung on a hook $v$, attached to the partition above opening V; but this is not a feature of the invention.

The mode of using the device is obvious from Fig. 1 of the drawings.

The nipple A is preferably made of pure rubber and being reinforced by the tube-section A' cannot collapse. As the spring E is free to yield in all directions, the nipple is as free to move as the teat on an udder, and the animal can bunt without injuring the feeder or itself. The vessel containing the food, being preferably outside the inclosure, cannot be knocked over by the animal. To clean the feeder, it is simply necessary to remove only the parts to be cleaned, which can be readily done by unscrewing the head from the end of spring, and when cleaned the parts can be readily attached. The supply-tube D, moreover, is protected from injury while in use, as the animal cannot bite or tangle it, the spring E serving as a guard therefor.

Having thus described my invention, what I therefore claim as new, and desire to secure by Letters Patent thereon, is—

1. In a suckling-feeder, the combination of a flexible supporting-spring, a nipple connected with the free end of the spring, and a tube for supplying liquid food to the nipple, substantially as described.

2. A suckling-feeder, comprising a flexible spring, a nipple connected with the free end of the spring, a removable tube-section in the nipple, reinforcing it, and a supply-tube, all substantially as described.

3. In a suckling-feeder, the combination of a spring, a head supported on the free end of the spring, a nipple attached to the head, and a supply-tube attached to the head, substantially as described.

4. A suckling-feeder, comprising a helical spring, means for fastening one end of the spring to a partition or support, a head attached to the free end of the spring, a nipple attached to the head, a guard, and a supply-tube connected to the head, substantially as described.

5. A suckling-feeder, comprising a spring, a head attached to the spring, a nipple attached to the head, a reinforce-tube within the nipple confined therein by the head, and a supply-tube connected to the head, substantially as described.

6. A suckling-feeder, comprising a spring, a flanged head attached to the free end of the spring, a supply-tube attached to the head, a nipple attached to the head having a contracted neck and an enlargement fitted to the head-flange, and a guard, substantially as described.

7. The herein-described suckling-feeder, comprising a helical spring means for attaching one end of the spring to a partition, a flanged head removably fitted into the free end of the helical spring, a nipple fitted on the flange of the head, a guard fitted to the nipple next the head, a reinforcing tube-section in the nipple, and a supply-tube connected to the head, substantially as and for the purpose described.

In testimony that I claim the foregoing as my own I affix my signature in presence of two witnesses.

MAURICE T. PHILLIPS.

In presence of—
 WM. C. STERN,
 H. V. STERN.